UNITED STATES PATENT OFFICE 2,533,456

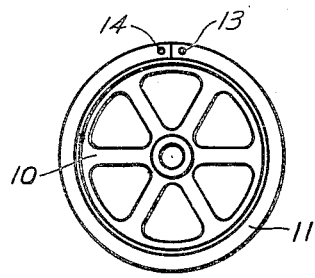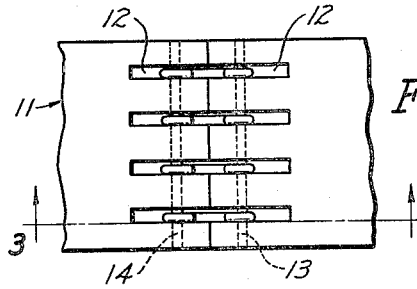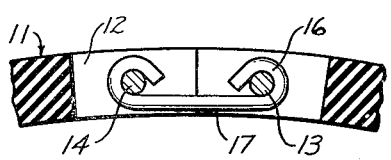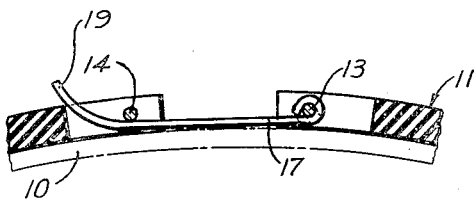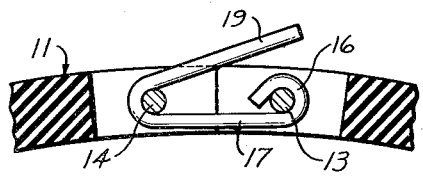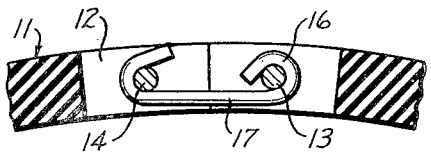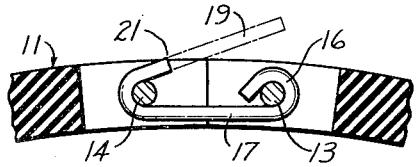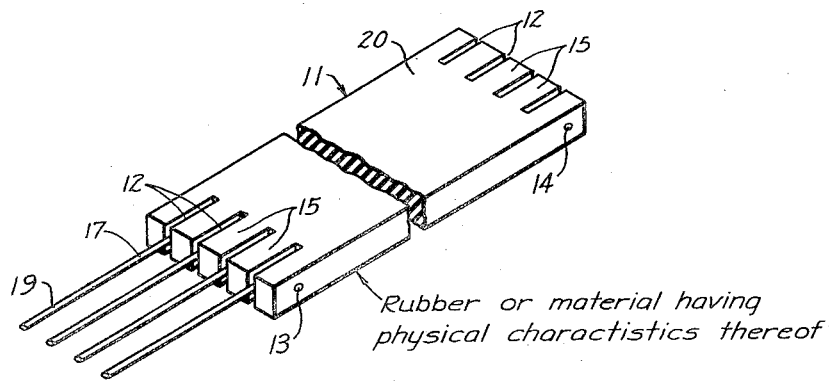

LAGGING FOR USE ON BELT PULLEYS

William H. Harrison, York, Pa.

Application September 20, 1946, Serial No. 698,160

4 Claims. (Cl. 74—230.7)

1

This invention relates to a lagging for use on belt pulleys and to a method of applying the same and more specifically to a lagging which may be applied to pulleys of approximate (D— or D—) diameters with equal facility and with perfect evenness in the final pulley surface.

As, is well known to those familiar to the art, the lagging of pulleys is ordinarily an operation requiring the services of an highly skilled mechanic due primarily to the facts that most pulleys are crowned and that pulley diameters are so loosely fixed that a substantial variation in diameters is found, even in new pulleys, of supposedly the same diameter. An important object of the present invention is the provision of a lagging which may be readily applied to different pulleys of the same rated diameter by the moderately skilled mechanic, which will conform to the contours of such pulley without regard to the normal variations in the crowning thereof and which may be readily and cheaply manufactured.

Another object of this invention is the provision of a ready and easily understood and practiced method of applying such a lagging to pulleys.

These and other objects I attain by the construction shown in the accompanying drawings wherein for the purpose of illustration I have shown a preferred embodiment of my invention and wherein:

Figure 1 is a side elevation of a pulley having a lagging applied thereto in accordance with my invention;

Figure 2 is a fragmentary face view thereof;

Figure 3 is an enlarged section on line 3—3 of Figure 2;

Figure 4 is a perspective view of the lagging;

Figures 5 to 8 inclusive are fragmentary sectional views illustrating the method of applying the lagging to a pulley.

Referring now more particularly to the drawings the numeral 10 indicates a pulley and 11 a lagging applied thereto in accordance with my invention. As more clearly shown in Figures 4 and 5 the lagging comprises a band of slightly less length than the circumference of the pulley to which it is to be applied said band being of rubber or other material having the physical elastic characteristics thereof and having at each end thereof a series of notches 12, the notches of these series aligning with one another when the band is applied about a pulley. Rods 13 and 14 are embedded in the material at opposite ends of the strip at the lands 15 between adjacent notches and traverse these notches. On the rod 13 I pivotally mount, at 16, connectors 17 each comprising a length of stiffly flexible material such as metal tape. These connectors are, for a reason presently to appear made of less width than the notches in which they engage.

In use the lagging after a preliminary cementing of the inner face 20 thereof and of the outer face of the pulley 10 it is wrapped about the pulley the ends of the lagging being at this time in spaced relation as shown in Figure 5. The free ends or extension portions 19 of the connectors are then passed through the notches 12 of the opposite end of the lagging from below and beyond the rod 14 from the outer ends of these notches as shown in Figure 5. The lagging is stretched to bring the ends thereof, which have been previously cemented, into engagement with one another and to cause the lagging to snugly conform to the surface of the pulley. The ends of connectors 17 are now reverted about the rod 14 as shown in Figure 6 to hold the lagging in what is to be its final position. The reverted ends 19 are then removed at a point slightly beyond rod 14 and between this rod and the end of the lagging in which rod 14 is mounted, as, for example, at 21 (Figure 7) following which the severed ends of the connectors are bent down around the rod 14 to complete the connection as shown in Figure 8.

It will be obvious that a lagging constructed and applied in accordance with my invention will provide a surface having no protuberances and will be lasting and firmly adherent by reason of the characteristics of the material employed which will cause the lagging to adhere to the pulley surface and snugly fit the same. It will also be obvious that certain changes in the illustrated construction are possible without, in any manner, departing from the spirit of my invention. I, accordingly, do not wish to be understood as limiting myself to the specific structure herein shown except as hereinafter claimed.

What I claim is:

1. A lagging for pulleys and the like comprising a band of material having the characteristics of rubber and of less length than the circumferential surface of the pulley whereby when applied to the pulley the band is under elastic tension, and connecting means for the ends of the band disposed entirely within the radial confines thereof and disposed in slots in the ends of the band whereby the ends of the band may be brought into abutting relation.

2. A lagging for pulleys and the like comprising a band of material having the characteristics of rubber and of less length than the circumferential surface of the pulley whereby when applied to the pulley the band is under elastic tension, and connecting means for the ends of the band disposed entirely within the radial confines thereof, comprising a rod traversing each end of the band and connectors pivoted to one of said rods and having coves to receive the other rod when the ends of the band are in contacting relation.

3. A lagging for pulleys and the like comprising a band of material having the characteristics of rubber and of less length than the circumferential surface of the pulley whereby when applied to the pulley the band is under elastic tension, opposite ends of said band having spaced notches formed therein, said notches being alined when the ends of the band are in juxtaposition, a rod traversing each end of the band and said notches and imbedded in the material of the band, and connectors pivoted upon the rod in the notches at one end of the band and having coves receiving the other of the rods when the ends of the band are in contacting relation.

4. A lagging for pulleys and the like comprising a band of material having the characteristics of rubber and of less length than the circumferential surface of the pulley whereby when applied to the pulley the band is under elastic tension, opposite end of said band having spaced notches formed therein, said notches being alined when the ends of the band are in juxtaposition, a rod traversing each end of the band and said notches and imbedded in the material of the band, connectors pivoted upon the rod in the notches at one end of the band and having coves receiving the other of the rods when the ends of the band are in contacting relation, said connectors further having extensions beyond said coves to facilitate their engagement about said other rod and being formed of stiffly resilient material.

WILLIAM H. HARRISON.

REFERENCES CITED

The following references are of record in the file of this patent:

UNITED STATES PATENTS

| Number | Name | Date |
|---|---|---|
| 748,674 | Webb | Jan. 5, 1904 |
| 1,803,357 | Robins | May 5, 1931 |

FOREIGN PATENTS

| Number | Country | Date |
|---|---|---|
| 470,261 | Great Britain | Aug. 11, 1937 |